United States Patent
Fujiwara

[11] 3,711,017
[45] Jan. 16, 1973

[54] AUTOMATIC VENT VALVE FOR A STEAM TRAP

[76] Inventor: Katsuji Fujiwara, 191 Nishitani, Hirasoka-cho, Kakogawa, Japan

[22] Filed: Feb. 8, 1971

[21] Appl. No.: 113,363

[30] Foreign Application Priority Data

Feb. 14, 1970  Japan ................................ 45/12982

[52] U.S. Cl. .................................................. 236/59
[51] Int. Cl. ................................................ F16t 1/08
[58] Field of Search ................... 236/53, 55, 59, 101

[56] References Cited

UNITED STATES PATENTS

| | | | |
|---|---|---|---|
| 890,555 | 6/1908 | Canfield et al. | 236/53 |
| 1,681,911 | 8/1928 | Spencer | 236/59 |
| 1,897,753 | 2/1933 | Cryer | 236/53 |
| 2,542,969 | 2/1951 | Clark | 236/53 |

*Primary Examiner*—Edward J. Michael
*Attorney*—David Toren et al.

[57] ABSTRACT

A steam trap having an automatic vent valve which comprises a disc-shaped bimetal member provided with a valve body facing to engage a valve seat. The valve seat is attached on the condensed water sump side of an air vent passage which is bored through a cover block of the trap, and which connects said sump with a condensed water outlet part.

4 Claims, 4 Drawing Figures

Fig. 1
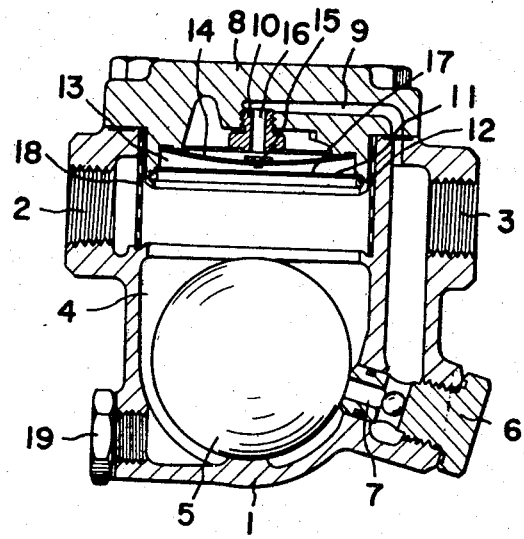
Fig. 2
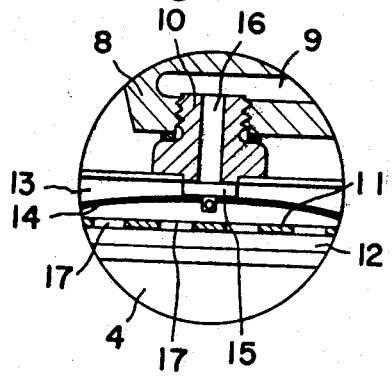
Fig. 3    Fig. 4
 
INVENTOR.
KATSUJI FUJIWARA
BY
Toren and McGeady
ATTORNEYS

3,711,017

AUTOMATIC VENT VALVE FOR A STEAM TRAP

BACKGROUND OF THE INVENTION

In a steam trap, air flowing in together with the condensed water will tend to cause air binding and will be apt to stop the operation of the trap, thereby necessitating that the air be promptly vented to outside the trap.

Usually, such a trap is provided with an air vent passage which connects a condensed water sump with an outlet port for the condensed water, a valve seat for venting air attached on the side of said condensed water sump closest to said air vent passage, a valve receiving chamber formed so as to surround said valve seat, and a disc-shaped bimetal member floatingly arranged within said receiving chamber to effect opening and closing of the valve by the action of temperature and pressure within said condensed water sump. Thus, the disc-shaped bimetal member itself will act as a valve body, and when the temperature is low, this bimetal member becomes concave to open the valve port. However, when the temperature is high, the bimetal member will turn up and become convex on the upside, thereby strongly pressing on the valve seat by fluid pressure to close the valve port. In such a construction, the surface of the bimetal member must be finished to a high degree, because the bimetal member itself acts as a valve body. Therefore, its production cost becomes high, and due to use even over short period, the bimetal member will be often deformed or corrode to cause leakage. Thus, handling and maintenance thereof become troublesome and its life is shortened.

This invention relates to an improvement in such an automatic vent valve for a steam trap, and has as its primary object elimination of such defects as mentioned above to provide a steam trap with an automatic vent valve having long life and high performance, and being low-priced as well as convenient in its handling and maintenance.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

BRIEF DESCRIPTION OF THE DRAWINGS

In the accompanying drawings:

FIG. 1 is a longitudinal sectional view of a free float type steam trap according to this invention;

FIG. 2 is a sectional view showing an enlargement of main parts shown in FIG. 1, wherein the vent valve is closed; and FIGS. 3 and 4 are views showing other embodiments of the valve body which may be used with a vent valve according to the present invention.

DESCRIPTION OF THE PREFERRED EMBODIMENTS

In the embodiment shown in FIG. 1 and FIG. 2, 1 denotes a trap main body, having an inlet port 2, an outlet port 3 and a condensed water sump 4. Within this condensed water sump 4, a spherical float 5 is received adjacent to a valve seat 6 provided on a lower side wall of the main body 1, and said float 5 is so arranged to be raised due to the inflow of condensed water, thus to open the valve port 7 for exhaust of the condensed water to the outlet port 3. In a cover block 8 fixed on the upper portion of the main body, there is bored on air vent passage 9 which connects the condensed water sump 4 with the outlet port 3, and on the side of said passage 9 closest the sump 4, there is attached a valve seat 10 for venting. On said cover block 8, a cover 11 is fitted by a snap ring 12 to form a receiving chamber 13 for a vent valve body, and within said chamber 13, a disc shaped bimetal member 14 is floatingly arranged, and a valve body 15 is attached on said bimetal member 14. Said bimetal member 14 comprises two metal plates having different coefficients of thermal expansion; namely a metal plate having higher expansion coefficient is arranged on the upper side and a metal plate having a lower expansion coefficient is arranged on the lower side to form said bimetal member 14. When the temperature is low, the bimetal 14 will bend concavely as shown in FIG. 1 and the valve body 15 is separated from the valve seat 10 to open a vent port 16, while when the temperature is high, the bimetal 14 will bend convexly as shown in FIG. 2 and the valve body 15 will be pressed on the valve seat 10 by the pressure of fluid to close the vent port 16. Said cover 11 is provided with a suitable number of holes 17 connecting the condensed water sump 4 with the receiving chamber 13.

Further, 18 denotes a cylindrical screen for filtering and 19 a drain plug.

In a steam trap having the above mentioned construction, when condensed water or a mixture of condensed water and air first flows in, the temperature within the trap main body is low and the bimetal 14 is concavely flexed and the vent port 16 is opened, so that the air flowing in the trap main body may freely flow out of the trap. And, when vapor flows in, the temperature within the trap will rise and the bimetal 14 turns convexly and the vent port 16 is closed by the valve body 15 to check the outflow of fluid.

It is to be understood that the shape of the valve body of the vent valve according to this invention need not be limited to that shown in described embodiment, but conical or spherical shapes as shown in FIG. 3 or FIG. 4 may be used therefor.

As mentioned above, in the vent valve according to this invention, the bimetal is not used as a direct valve body, but a valve body is particularly provided so that there is no necessity for high grade finishing of the surface of the bimetal member, resulting in a considerable decrease in the production cost. Therefore, a steam trap, which is low-priced, durable, easily handled and maintained, and wherein operation of the valve is very accurate, may be provided, rendering great services to the industrial world.

While specific embodiments of the invention have been shown and described in detail to illustrate the application of the inventive principles, it will be understood that the invention may be embodied otherwise without departing from such principles.

What is claimed is

1. A steam trap comprising a sump body defining a condensed water sump, inlet means for said sump, a condensed water outlet port extending from said sump, a spherically shaped float member located within said sump and engaging said outlet port to open and close said port in accordance with the level of liquid within said sump, said outlet port being located to extend obliquely through said sump body to said water sump and engaging the surface of said spherical float at a point spaced laterally and upwardly from the bottom center of said spherical float, an air vent passage extending between said sump and said outlet port, a valve seat located at one end of said vent passage proximate said water sump, a disc type snap action bimetallic valve member located within the portion of said sump body defining said condensed water sump, said valve member being located above said spherical float member and arranged to be responsive to temperature changes within said sump, said valve member operating to snap between a first position and a second position in response to said temperature changes in said sump, and a valve body formed separately from said valve member and mounted thereon located to engage and disengage said valve seat to open and close said air vent passage when said valve member snaps between said first and said second positions, respectively, thereby to control air venting from said water sump in response to temperature changes therein.

2. A steam trap according to claim 1, wherein said valve body comprises a rectangular shape.

3. A steam trap according to claim 1, wherein said valve body comprises a conical shape.

4. A steam trap according to claim 1, wherein said valve body comprises a spherical shape.

* * * * *